UNITED STATES PATENT OFFICE.

ALFRED KERN, OF BASLE, SWITZERLAND, ASSIGNOR TO THE BADISCHE ANILIN AND SODA FABRIK, OF MANNHEIM, GERMANY.

METHYL-BLUE COLORING-MATTER.

SPECIFICATION forming part of Letters Patent No. 297,415, dated April 22, 1884.

Application filed January 10, 1884. (No specimens.)

*To all whom it may concern:*

Be it known that I, ALFRED KERN, a citizen of the Swiss Republic, residing at Basle, Switzerland, have invented new and useful Improvements in the Manufacture of a Purple Dye-Stuff or Coloring-Matter, of which the following is a specification.

This invention relates to the production of "benzyl-violet B"—a purple dye-stuff or coloring-matter produced by the condensation of tetra-methyl-diamido-benzophenone with dibenzyl-aniline.

In carrying out my invention I take about ten parts, by weight, of dry and finely-powdered tetra-methyl-diamido-benzophenone, and mix the same intimately with about ten parts, by weight, of dibenzyl-aniline, and I then add about nine parts, by weight, of oxychloride of phosphorus. The mixture thus obtained is kept constantly stirred until the reaction, which quickly sets in, and which manifests itself by a considerable rise of temperature, gradually begins to subside. I then heat the semi-fluid dark-colored product thus obtained up to a temperature of about 120° centigrade, and I maintain the said temperature during about half an hour, or until a homogeneous bronze-colored "melt" is obtained, which solidifies upon cooling.

In order to separate my new purple coloring-matter thus produced, the said melt is powdered, and then washed with cold water until the washings begin to assume a purple coloration. The washed residue is then exhausted with boiling water, with the addition of about one part, by volume, of strong hydrochloric acid of about 1.18 specific gravity, and the solution thus obtained is filtered and precipitated with common salt. The precipitated coloring-matter may be further purified by renewed solution in boiling water and precipitation with common salt. After filtering and drying at a temperature of about 60° centigrade, benzyl-violet B presents the following characteristics: It has the appearance of a dark metallic green or bronze colored powder. Upon being heated, it fuses into a blue transparent mass, and upon the application of stronger heat it becomes decomposed under evolution of pungent vapors possessing the characteristic smell of oil of bitter almonds and other benzyl compounds.

Benzyl-violet B is sparingly soluble in cold water. It dissolves easily in boiling water, alcohol, and glacial acetic acid. It forms, likewise, a solution with benzole, and is precipitated from the same by the addition of petroleum spirit or ligroine. The color of its solutions is a bluish purple, which becomes changed, by the gradual addition of strong hydrochloric acid, first into blue, then into green, and at last into orange yellow. These changes, however, do not take place with the same readiness as in the case of the ordinary benzylated methyl-violet being submitted to the same treatment with hydrochloric acid, in consequence of which the dyes produced by benzyl-violet B upon animal or vegetable fiber are less affected by acids than the corresponding shades dyed with the ordinary benzylated methyl-violets hitherto in use. Benzyl-violet B dyes a bright bluish purple upon the said fibers.

What I claim as new, and desire to secure by Letters Patent, is—

As a new product, the purple dye-stuff or coloring-matter hereinbefore described, and having the characteristics above set forth.

In testimony whereof I have hereunto set my hand and seal in the presence of two subscribing witnesses.

ALFRED KERN. [L. S.]

Witnesses:
N. HENZI,
CHS. A. RICHTER.